Sept. 5, 1939.   W. W. HAMILL   2,172,125
WALL PLUG FOR INSERTION IN WALLS, FLOORS, CEILINGS, AND OTHER PLACES
Filed Jan. 25, 1937

William W. Hamill
INVENTOR
ATTORNEY.

Patented Sept. 5, 1939

2,172,125

UNITED STATES PATENT OFFICE 2,172,125

WALL PLUG FOR INSERTION IN WALLS, FLOORS, CEILINGS, AND OTHER PLACES

William Wilson Hamill, Forest Lane, Chigwell, England

Application January 25, 1937, Serial No. 122,238
In Canada January 28, 1936

4 Claims. (Cl. 85—2.4)

This invention relates to plugs for insertion in walls, floors, ceilings, and other places for support, attachment or connection of objects, and more particularly to a sleeve plug made of rubber or material having characteristics similar to those of rubber, which when expanded by an instrument driven into its bore, has its periphery enlarged to fit closely the bore of the wall or other cavity in which it is inserted.

The present invention consists in an improved form of plug provided on its periphery with anti-rotational means and constructed so that the initial stages of expansion are enabled to take place for a lower value of radial pressure exerted by the instrument of expansion whereby the tendency of the expanding instrument to turn the plug in the cavity is diminished, and, particularly with oversize cavities, a more ready and satisfactory enlargement of the plug periphery is obtained, without adversely affecting the high ultimate grip of which a rubber or like plug is capable.

Having the aforesaid and other objects in view as will appear from a perusal of the following description, the invention consists in an improved structure of the plug including a number of slits leading outwards from the bore of the plug but terminating short of the periphery so as to divide the plug body into a number of segments bounded and connected by an outer unbroken annulus.

In the accompanying drawing which illustrates the invention Figure 1 shows in end elevation a plug according to the invention before insertion in a cavity.

Figure 1:
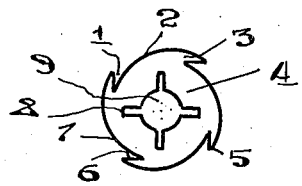

The configuration of the plug periphery may be as desired but in the preferred form it embodies a number of longitudinal grooves or channels 1 which divide the peripheral surface 2 into the equivalent of arms or flaps 3 flexibly anchored to the plug body 4 in order that their free outer ends or parts 5 may move inwards radially towards the axis of the plug or radially outwards to accommodate for holes smaller or larger than the nominal size, and may also function as anti-rotational means the effect of which is to allow the plug to be turned easily in an anti-clockwise direction during insertion in the cavity, but to restrain turning in a clockwise direction under the rotative pull of the expanding screw. The leading edges 6 of the channels are undercut and the surfaces 7 intermediate the undercut faces are preferably eccentric to the longitudinal axis of the plug.

Figure 5:
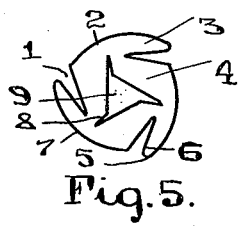
Figure 5 is an end view of a modified form of plug.

The slits 8 leading from the bore 9 of the plug are radial in Figure 1, narrow in width, and preferably equal in number, the number of peripheral grooves 1, the positioning or emplacement of the slits being such as to lead to the middle of the sections of rubber lying between adjacent channels, that is, the outer ends of the slits alternate with the peripheral grooves. In cross-section, the slits may be parallel-sided as in Figure 1 or convergent outwards as in Figure 5, and may run radially as in Figure 1 or tangentially as in Figure 5. The bore of the plug is circular in Figure 1 and polygonal, e. g. triangular, in Figure 5. In the latter figure, the channels 1 are more tangential and extend more deeply into the body of the plug than the form depicted in Figure 1.

The invention thus embraces two modes of reducing the turning effect of the screw, which is most objectionable in the beginning of the expansive movement of the plug walls, since until the periphery of the plug is pressing with some force on the cavity walls, the plug may be carried round by the screw and merely enlarge the hole, especially with walls of soft and friable material such as plaster. The resistance of the plug periphery should be as high as possible so as to hold and grip the cavity bore; and the reluctance of the plug to enlarge should be as low as may be. By placing the bore slits between the peripheral channels, the continuity of the bore region of the plug is broken and the resistance to outward displacement of the segmental zones lying between the slits is considerably diminished up to the stage when the cross-sectional shape of the plug approximates to an annulus under the effect of the advance of the tapered or enlarging part of the instrument of expansion into the plug bore. It follows that as less radial pressure is required to expand the plug in the initial stages, the force tending to rotate the plug is likewise lessened. The same effect is also observable where the instrument of expansion operates by rectilinear motion only as with a driving nail, in that less force is needed to drive the instrument home.

Figure 2:
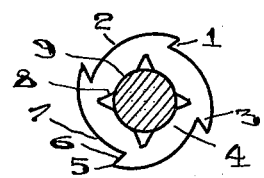
Figure 2 is a view similar to Figure 1 showing the manner in which prior expansion of certain parts of the plug periphery is obtained.
Figure 3:
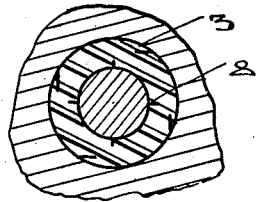
Figure 3 shows in situ the plug of Figure 1 after expansion is complete.
Figure 4:
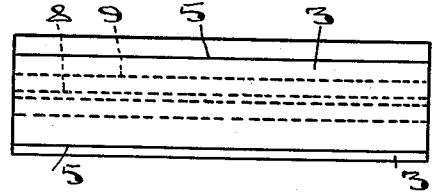
Figure 4 is an elevation at right angles to Figure 1.

An amplified movement of the free ends of the peripheral flaps occurs by reason of the presence of the bore slits, as outward movement of the rubber lying between the bore and the inner ends of the peripheral channels is accompanied by a larger movement of the free ends of the flaps. This action is illustrated in Figure 2 which shows the change in position of the flap ends which takes place when a taper instrument is forced into the bore, depicted for convenience with the plug uninserted in a cavity to illustrate the action, though it will be understood that instead of the degree of enlargement shown, gripping pressure is set up and turning prevented, the enlargement of the outside dimension of the plug being dependent on the relative diameters of the plug and the hole. The improved sections can be readily extruded.

Having thus described my invention, what I claim is:

1. A relatively soft rubber plug adapted for expansion with a wall opening or the like, said plug comprising an annular body formed with a longitudinal bore, the exterior of the body having spaced longitudinal flaps connected at one end to the body and otherwise free of the body, the body being formed with slits communicating with the bore, ranging outwardly from the bore and terminating short of the peripheral margin of the body, the slits materially reducing the resistance of the wall to expansion under the initial introduction of an expanding element into the bore, whereby, under such lessened resistance to expansion, the initial introduction of the expanding element will more readily force the marginal circumferential wall of the body and the flaps into holding contact with the opening in the wall or the like and thus prevent turning of the body in said wall opening at virtually the initial introduction of the expanding element.

2. A relatively soft rubber plug adapted for expansion within a wall opening or the like, said plug comprising an annular body formed with a longitudinal bore, the exterior of the body having spaced longitudinal flaps connected at one end to the body and otherwise free of the body, the wall of the body being formed with slits extending longitudinally of the body, communicating at one end with the bore and terminating short of the terminal surface of the body, the slits being formed in those portions of the body included between adjacent flaps.

3. A relatively soft rubber plug adapted for expansion within a wall opening or the like, said plug comprising an annular body formed with a longitudinal bore, the exterior of the body having spaced longitudinal flaps connected at one end to the body and otherwise free of the body, the wall of the body being formed with longitudinal slits leading outwardly from and communicating with the bore of the body and located midway of the exterior flaps.

4. A construction as defined in claim 3, wherein the slits extend radially from the bore and approximately for one-half the thickness of the body beyond the bore.

WILLIAM WILSON HAMILL.